Aug. 19, 1958

L. P. GARVEY ET AL 2,847,937

ACTUATOR MECHANISM

Filed Sept. 14, 1954

INVENTORS
Louis P. Garvey,
Harry O. Mackie &
BY Clyde H. Schamel
Paul Fitzpatrick
ATTORNEY

United States Patent Office 2,847,937
Patented Aug. 19, 1958

2,847,937

ACTUATOR MECHANISM

Louis P. Garvey, Detroit, Harry A. Mackie, Birmingham, and Clyde H. Schamel, Royal Oak, Mich., assignors to General Motors Corporation, Detroit, Mich., a corporation of Delaware Application September 14, 1954, Serial No. 455,836

4 Claims. (Cl. 103—3)

This invention relates to operating mechanisms for vehicle windows and the like, and more particularly to fluid pressure type mechanisms.

It is well known in the prior art to utilize hydraulic actuators for vehicle windows, seats, convertible tops and the like, wherein fluid pressure therefor is obtained from an electrically driven pump. However, the prior art devices, for the most part, have utilized a single relatively large capacity pressure generating pump remotely disposed with reference to the individual actuators and, thus, required extensive plumbing in order to provide fluid connections between the several actuating cylinders and the common source of fluid pressure. In addition to the extensive plumbing required in such systems, further difficulties have been encountered because actuators mounted in the doors of a vehicle require flexible conduits in order to avoid interference with swinging movements of the door.

An object of the present invention is to provide a unitary fluid pressure generating pump, valving structure and fluid actuator.

Another object is to provide an actuating mechanism of the stated character which may be mounted as a complete unit in any location in a vehicle body.

A further object of the invention is to provide an electrically energized hydraulic actuating mechanism wherein the electrical circuit necessary to provide energization is substantially simplified.

Still a further object is to provide an electric hydraulic actuator wherein the fluid travels through a short closed circuit, thereby requiring a minimum of fluid and eliminating the necessity for periodic addition to the fluid supply.

Yet another object of the invention is to provide an electrically operated hydraulic actuating mechanism wherein an electrically driven source of fluid pressure is coupled directly to a pressure directing valve body, which, in turn, is in direct communicating relation with the fluid motor means.

Still a further object is to provide an electrically powered hydraulic actuator of the closed circuit type having an externally disposed fluid conduit communicating between the valve body and one side of the fluid actuator.

A still further object is to provide a structure of the stated character wherein the fluid conduit is coupled directly to the valve body and the fluid motor in leakproof relation therewith, no intermediate fittings or threaded parts being required.

Still a further object is to provide a fluid responsive actuator of the stated character wherein the direction of movement of the actuator is controlled directly by the operation of the pressure generating motor.

Yet a further object is to provide an electric hydraulic actuator having a pressure directing valve mechanism which is automatically responsive to the change of direction of rotation of the pressure generating pump.

These and other objects and advantages of the invention will become more fully apparent from the following description wherein reference is made to the accompanying drawings illustrating the preferred embodiments of the invention.

In the drawings:

Figure 3 is a view similar to Figure 2, showing the disposition of the valves during the retraction stroke.

Figure 1:
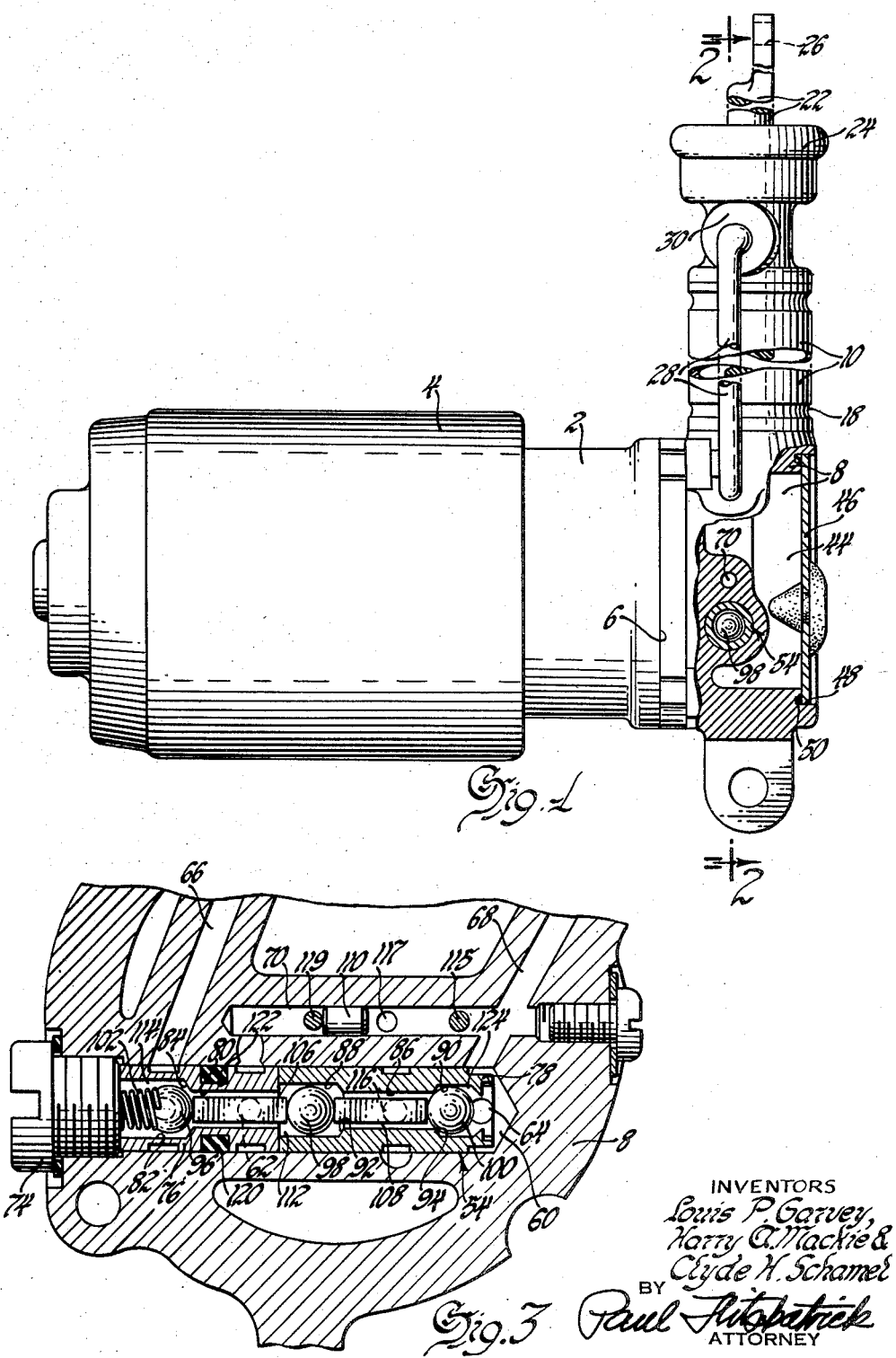
Figure 1 is a sectional side elevational view of the unitary pump, valve structure and actuator assembly, certain parts being broken away to more clearly illustrate the construction thereof.

Referring now to the drawings and particularly Figure 1, there is illustrated a hydraulic actuator of the type suitable for use in raising and lowering vehicle windows, controlling fore and aft seat adjustments, operating convertible top mechanisms and other applications too numerous to mention. In Figure 1, the reference numeral 2 indicates generally a unitary reversible fluid pressure generating mechanism which is driven by a self-contained electric motor 4. Fluid pressure generating mechanism 2 is preferably of the conventional vane type and is so constructed and arranged as to provide instantaneous fluid pressure selectively through one of two separate discharge ports responsive to reversal of rotation of motor 4. Since the precise construction of pressure generating mechanism 2 and self-contained motor 4 form no part of the invention, a detailed description thereof will be omitted. However, it will be understood that pump 2 need not necessarily be of the vane type and that other forms of reversible fluid pressure generating pump might be utilized. Attached in direct communicating relation with the open face 6 of pump 2 is a valve body or housing 8. Valve body 8 is provided with internal valving structure which is automatically responsive to reversal of flow of fluid resulting from change of direction of rotation of fluid pressure pump 2 to direct fluid under pressure selectively in opposite directions through a closed fluid circuit in which is interposed a fluid actuator cylinder 10. The lower end of cylinder 10 is coupled in direct communicating relation with the upwardly projecting stem portion 12 of valve body 8. As seen best in Figure 2, the outer periphery of stem portion 12 is provided with an annular groove 14 in which is disposed a circular seal 16. After disposition of the lower end of cylinder 10 in surrounding relation with stem 12, the wall of cylinder 10 adjacent groove 14 is spun or rolled inwardly to form an annular reduced portion 18 which tightly compresses seal 16 and assures a fluid tight connection between stem 12 of valve body 8 and the inner wall of cylinder 10.

Slidably disposed interiorly of cylinder 10 is a double acting piston 20 which is linearly movable therein responsive to fluid pressure. At its upper end piston 20 has connected thereto a piston rod 22 which extends upwardly through a circular aperture formed in the closed upper end wall 24 of cylinder 10. At its outer extremity rod 22 is flattened and provided with a transversely extending aperture 26 to facilitate connection thereof with the device to be actuated.

Extending between the upper side wall of cylinder 10 and the interior of valve body 8 is an external conduit or tube 28 which is secured at either end in fluid tight communicating relation with a coupling boss 30 formed integrally in cylinder 10 and a coupling boss 32 formed integrally on valve body 8, respectively. It should be particularly noted that the mode of coupling the opposite ends of conduit 28 with the cylinder 10 and valve body 8 totally eliminates the necessity for fittings or threaded connections and thus substantially simplifies the construction as well as materially reducing the cost. As seen best in Figure 2, conduit 28 is formed with a radially outwardly extending circumferential rib 34 of C-shaped cross section, which is positioned respectively adjacent each end 36 of the conduit 28. Each boss 30 and 32 is provided with stepped bores 38 which are adapted to receive the terminal end portions of conduit 28. Disposed interiorly of bores 38 against the shoulder portion 40 are resilient circular gaskets 42. When conduit 28 is assembled in the position shown, each annular rib 34 seats against the respective gaskets 42. After insertion of the respective ends of conduit 28 in bores 38, the outer perimetral margin of each boss is peened downwardly and inwardly to engage the back of annular rib 34 and force the latter into compressed engagement with the circular gaskets 42. In this manner, a positive and effective fluid tight seal is accomplished without requiring the addition of intermediate communicating parts or the necessity of resorting to threaded connections.

As previously mentioned, the open outer face 6 of pressure generating pump 2 is secured in fluid tight communicating relation with the front face of valve body 8. The rear of valve body 8 is cored to form a fluid reservoir 44, the open outer side of which is closed by a circular cover plate 46. Plate 46 fits in a circular recess 48 in body 8 and is retained therein against a circular gasket 50 by peening over the perimetral edge of recess 48. Drilled passages formed in body 8 and communicating with pump 2 and cylinder 10 permit the flow of fluid under pressure from fluid pressure pump 2 into either the lower end of cylinder 10 or the upper end thereof, depending upon the direction of rotation of the pump. To this end the hollow interiors of the fluid pump 2, valve body 8 and actuating cylinder 10 are completely filled with a suitable hydraulic fluid, except for sufficient space in reservoir 44 to allow for fluid expansion resulting from temperature rise. It will also be seen that the volumetric capacity of cylinder 10 at opposite sides of piston 20 is slightly different, owing to the presence of piston rod 22. However, when the fluid pump 2 rotates in one direction, fluid under pressure is forced into the lower portion of the cylinder 10 and simultaneously is exhausted a similar quantity from the upper portion of cylinder 10 at the same rate into the reservoir 44. Reservoir 44 compensates for the slight difference in volumetric capacity mentioned and returns the fluid to the intake side of the pump 2 for repetition of the fluid circuit. Upon reversal of pump 2, the fluid circuit is identical, but in the reverse direction.

Figure 2:
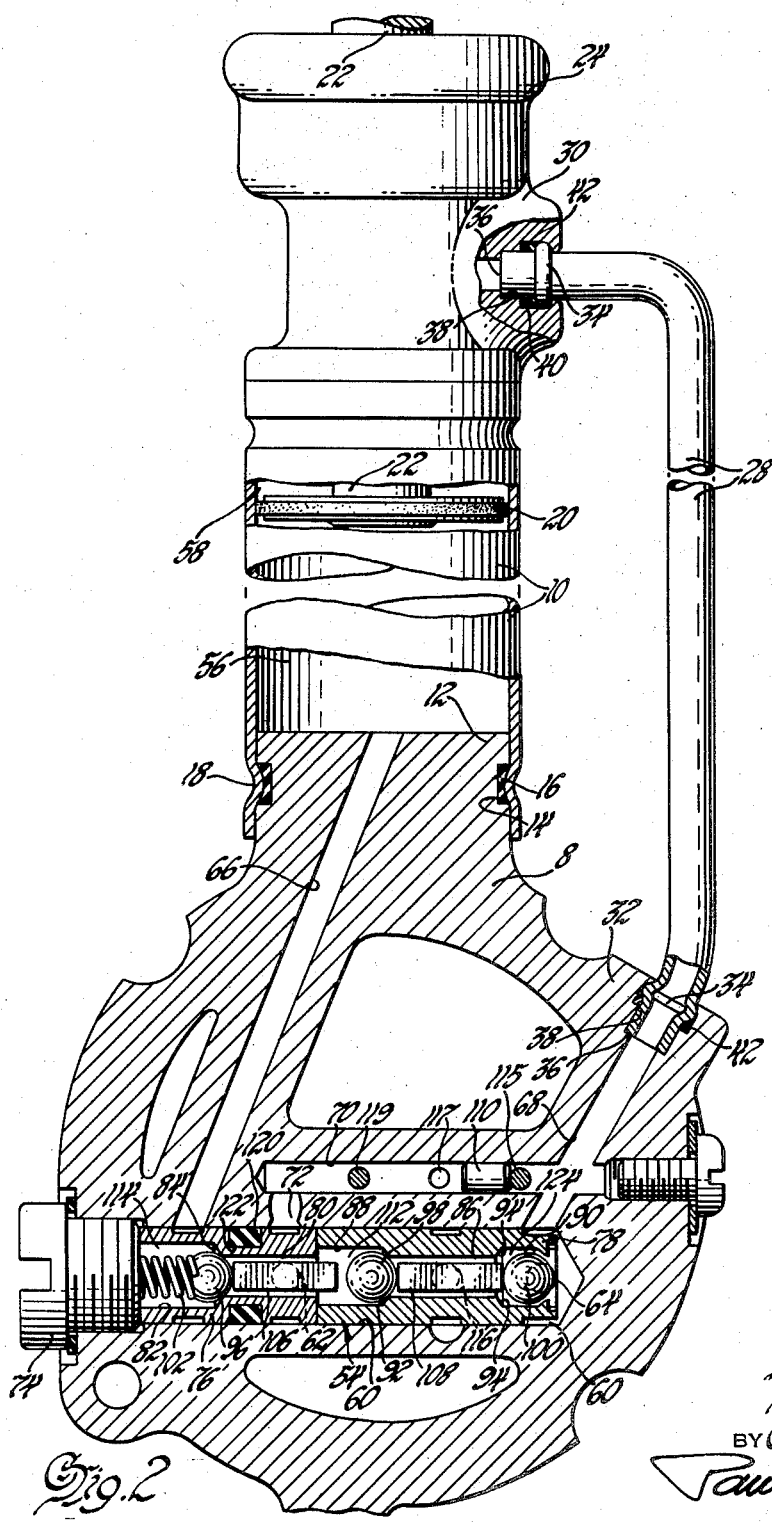
Figure 2 is a sectional front elevational view looking in the direction of arrows 2—2 of Figure 1 and illustrating the location of the various valve components during operation of the actuator in the extension stroke.

In order to control the direction of flow of fluid selectively into the lower or upper portion of the cylinder 10 in accordance with the invention, the valve body 8 has disposed therein a valve assembly 54, which is automatically responsive to the direction of flow of fluid from pump 2 to direct the flow of fluid selectively into the lower portion 56 of cylinder 10 or the upper portion 58 thereof, respectively. As seen in Figure 2, the valve body 8 is provided with a transversely directed drilled passage 60 which communicates with two spaced apart axially directed fluid admitting passages 62 and 64. Passages 62 and 64, respectively, communicate with the interior of pump motor 2, passage 62 being arranged to receive fluid under pressure upon rotation of the pump in one direction and passage 64 being disposed with reference to pump 2 in a manner whereby fluid under pressure passes therethrough responsive to rotation of the fluid pump in the opposite direction. Communicating with and extending diagonally upwardly from drilled passage 60 are two spaced apart drilled passages 66 and 68 which respectively communicate with the lower portion 56 of cylinder 10 and the fluid conduit 28. Slightly above and parallel with drilled passage 60, there is provided a second transversely directed drilled passage 70. Passage 70 communicates with drilled passage 60 at one end through a short connecting passage 72 and near its opposite end communicates with passage 60 via the lower portion of passage 68. Valve assembly 54, previously referred to, is slidably disposed in bore 60 and is retained therein by means of threaded plug 74 which threadably engages the internally threaded outer end of passage 60.

Valve assembly 54 is formed of two abutting cylindrical core members 76 and 78 which are maintained in axial compression by the pressure of threaded member 74. Member 76 is provided with a central bore 80 and counter bore 82 forming a valve seat 84 while member 78 is formed with a bore 86 having counter bores 88 and 90 forming valve seats 92 and 94. Ball valves 96, 98 and 100, respectively, seat on valve seats 84, 92 and 94 depending upon the direction of flow of fluid from pump motor 2. Ball valve 96 is normally urged against seat 84 by coil spring 102 while valves 98 and 100 are normally free and seat on 92 and 94 only as a result of fluid pressure. Slidably disposed in bore 80 of member 76 between ball valves 96 and 98 is a spacer member 106 while a spacer member 108 is slidably disposed in bore 86 of member 78 between ball valves 98 and 100. Slidably disposed in bore 70 is an alternator or blocking valve 110, the purpose of which will be described shortly.

In order that the invention may be fully understood, a description of the mode of operation will be given. For the purpose of illustration, assume that pump motor 2 is rotating in a direction effective to supply fluid under pressure through drilled passage 62. Hydraulic fluid under pressure flows from passage 62 into the chamber 112 causing ball valve 98 to move to the right against valve seat 92. As pressure builds up in chamber 112, ball valve 96 is forced to the left against the pressure of spring 102 permitting fluid to pass into chamber 114. Simultaneously, fluid passes from chamber 112 through passage 72 to transverse passage 70, causing alternator valve 110 to move to the right against limit pin 115. When in this position, valve 110 opens a port 117 which leads to the central part of pump 2 to provide oil pressure at the base of each vane, and thus, assures steady contact between the outer edges of the vanes and the inner wall of the pump barrel. Only a small quantity of fluid passes through port 117, the major quantity of fluid entering chamber 112 passes into chamber 114 and is directed through passage 66 upwardly into the lower chamber 56 of cylinder 10 causing the piston 20 to be actuated upwardly. As piston 20 moves upwardly, the fluid in the upper chamber 58 of cylinder 10 is forced into conduit 28 downwardly through passage 68 and into transverse drilled passage 70. As the fluid enters passage 70, it is blocked by alternator valve 110 and redirected downwardly through passage 68 into bore 60, through a passage 116 which communicates with fluid reservoir 44. Since reservoir 44 communicates with the intake side of pump 2, it will be apparent that discharged fluid passes from the reservoir back into the pump and continues the course just described. As soon as piston 20 reaches its upward limit of extension, pump motor 2 is deenergized. Since the particular form of limit control for deenergizing the motor and pump forms no part of the invention, the description thereof will be omitted, it being understood that any suitable form thereof may be utilized. As soon as pump 2 stops, spring 102 forces the ball valve 96 to return against the seat 84 and prevents the piston 20 from moving downwardly under the weight of a vehicle window or other actuated member. A circular gasket 120, disposed between an annular groove 122 on the outer periphery of core member 76, is compressed against the wall of drilled passage 60 and prevents leakage of fluid around the core back into chamber 112.

In Figure 3, the ball valves are shown in the positions assumed when the piston is in the retraction or downward stroke. Thus, upon rotary movement of the pump 2 in the opposite direction, fluid under pressure enters passage 64 into chamber 124, forcing ball 100 leftward against the seat 94. Spacer 108 is, in turn, moved leftward by ball 100 to displace ball 98 from seat 92. Simultaneously, ball 98 moves against spacer 106 which, in turn, displaces ball 96 from seat 84. Since ball 100 is seated against valve seat 94 and prevents passage of fluid from chamber 124 through the valve core 78, pressure builds up in chamber 124 causing fluid to enter drilled passage 68 and transverse passage 70. Upon entrance into passage 70, the fluid forces alternator valve 110 to the left against limit pin 119, permitting fluid to pass through port 117 for the purpose previously described. It will thus be seen that alternator valve 110 is slidably responsive in passage 70 to permit passage of fluid under pressure to the inner edges of the vanes in pump 2 when the pump is operating, but prevents circulation of fluid between the opposite sides of the valve body. Simultaneously, fluid is conducted upwardly from passage 68 through conduit 28 into the upper portion 58 of cylinder 10. As fluid enters the upper portion of cylinder 10, piston 20 is forced downwardly. Upon downward movement of piston 20, the fluid in the lower portion 56 of cylinder 10 is forced to return through passage 66 into chamber 114. From chamber 114 fluid is directed past ball 96 into chamber 112 around ball 98 and through passage 116 into the reservoir 44 for return to pump 2.

It will now be seen that the valve mechanism of the present invention is directly controlled by pump operation and automatically responds to reversal of rotation thereof. Because of this feature, only external control of the pump motor is required. The electrical connections required are, therefore, extremely simple, it being necessary to provide only a single lead wire from the source of energy to the electric motor incorporated in the pump 2. Thus, the complexity of installation and time required therefor is substantially reduced, and the difficulties of tracing occasional electrical malfunctions is substantially simplified.

From the foregoing it will be seen that there has been provided a novel unitary pressure generating pump, fluid actuator and automatic valve mechanism therefor. The mechanism is not only simple in construction and extremely compact, but is so constructed and arranged that the direction of movement of the actuator is automatically controlled by the direction of rotation of the pressure generating pump, whereas similar devices have heretofore required independent or concurrent remote control of the valve mechanism to alternate the direction of flow of the fluid.

While but one embodiment of the invention has been shown and described, it will be apparent that other changes and modifications may be made therein. It is, therefore, to be understood that it is not intended to limit the invention to the embodiments shown but only by the scope of the claims which follow.

We claim:

1. In a device of the class described, a reversible fluid pump, a control valve comprising a casing having fluid inlet passages formed therein, said pump having communication with said casing and being selectively operable to cause flow of fluid through one or the other of said passages, means defining a transverse passage between said inlet passages, a pair of fluid conducting passages communicating with opposite ends of said transverse passage, a valve assembly disposed in said transverse passage and operative to control the flow of fluid from said inlet passages to said fluid conducting passages, said valve assembly comprising a pair of cylindrical core members having axially aligned valve seats formed thereon, three closure members engageable with said seats, two of said members being selectively movable against their respective seats responsive to fluid pressure from one or the other of said inlet passages, respectively, so as to permit flow of fluid to one of said fluid conducting passages and to block flow to the other, the other of said closures being normally spring urged against its seat to prevent return flow through one of said fluid conducting passages, and a pair of spacers interposed respectively between said first and second closures and said second and third closures, said spacers being effective upon movement of one of said fluid responsive closures to prevent seating of the other of said closures.

2. In a device of the class described, a reversible fluid pump, a control valve comprising a casing having fluid inlet passages formed therein, said pump communicating with said fluid inlet passages and being selectively operable to cause flow of fluid through either one or the other of said passages, means defining a transverse passage connecting said inlet passages, a pair of fluid conducting passages communicating with opposite ends of said transverse passage, a valve assembly disposed in said transverse passage and operative to control the flow of fluid from said inlet passages to said fluid conducting passages, said valve assembly comprising a pair of axially aligned core members having three spaced apart axially aligned valve seats formed thereon, three ball valves disposed interiorly of said core member and engageable with said seats, the first and second ball valves being selectively movable against their respective seats responsive to fluid pressure from one or the other of said inlet passages, respectively, so as to permit flow of fluid to one of said fluid conducting passages and to block flow to the other, the third ball valve being normally spring urged against the other of said seats, and a pair of spacers interposed respectively between said first and second ball valves and said second and third ball valves, said spacers being effective upon movement of said first ball in one direction to prevent seating of the second and third ball valves and upon movement of the second ball valve in the opposite direction to prevent seating of the first ball valve.

3. In a device of the class described, a reversible fluid pump, a control valve comprising a casing having fluid inlet passages formed therein, said pump communicating with said fluid inlet passages and being selectively operable to cause flow of fluid through either one or the other of said inlet passages, means defining a transverse passage connecting said inlet passages, a pair of fluid conducting passages communicating with opposite ends of said transverse passage, a valve assembly disposed in said transverse passage and operative to control the flow of fluid from said inlet passages to said fluid conducting passages, said valve assembly comprising a pair of axially aligned core members having three spaced apart axially aligned valve seats formed thereon, three ball valves disposed interiorly of said core member and engageable with said seats, the first ball valve being movable against its respective seat responsive to fluid pressure through one of said inlet passages, the second ball valve being movable against its respective seat responsive to fluid pressure through the other of said inlet passages, the third ball valve being normally spring urged against its seat, and a pair of spacers interposed respectively between the first and second ball valves and the second and third ball valves, said spacers being effective upon seating of the first ball valve to prevent seating of the second and third ball valves and upon seating of the second ball valve to prevent seating of the first ball valve whereby to prevent circulation between opposite ends of the valve body during operation of said pump in either direction.

4. The structure defined in claim 3 wherein one of said core members is provided with a common return outlet passage communicating with said pump, said passage being disposed between said first and second ball valves whereby fluid may return to said pump around the first ball member when said second ball member is seated and around the second ball member when the first ball member is seated.

(References on following page)

References Cited in the file of this patent

UNITED STATES PATENTS

| | | |
|---|---|---|
| 1,904,531 | Raymond | Apr. 18, 1933 |
| 2,292,331 | Vertson | Aug. 4, 1942 |
| 2,467,508 | Trautman | Apr. 19, 1949 |
| 2,483,312 | Clay | Sept. 27, 1949 |
| 2,588,520 | Halgren et al. | Mar. 11, 1952 |
| 2,621,593 | Schmiel | Dec. 16, 1952 |
| 2,640,323 | McLeod | June 2, 1953 |
| 2,640,426 | McLeod | June 2, 1953 |
| 2,640,465 | McLeod | June 2, 1953 |
| 2,648,346 | Deardorff et al. | Aug. 11, 1953 |
| 2,657,533 | Schanzlin et al. | Nov. 3, 1953 |
| 2,680,016 | McLeod | June 1, 1954 |